United States Patent [19]

Sommerman et al.

[11] 3,840,716

[45] Oct. 8, 1974

[54] DISCHARGE CONTROL SHIELD FOR HIGH VOLTAGE ELECTRICAL APPARATUS INCLUDING A DIELECTRIC BARRIER

[75] Inventors: George M. L. Sommerman; Owen Farish; Alan H. Cookson, all of Pittsburgh, Pa.

[73] Assignee: Westinghouse Electric Corporation, Pittsburgh, Pa.

[22] Filed: Nov. 14, 1972

[21] Appl. No.: 306,493

[52] U.S. Cl. ............... 200/148 R, 317/61, 174/28, 174/140 R
[51] Int. Cl. ........................................... H01h 33/82
[58] Field of Search ............ 174/28, 29, 73 R, 99 B, 174/16 B, 140 R; 200/148 R

[56] References Cited
UNITED STATES PATENTS

| | | | |
|---|---|---|---|
| 3,448,202 | 6/1969 | Whitehead | 174/28 |
| 3,529,201 | 9/1970 | Rudolph | 174/140 R |
| 3,585,270 | 6/1971 | Trump | 174/28 |
| 3,596,028 | 7/1971 | Kane | 200/148 R |
| 3,671,109 | 11/1971 | Nakata | 174/28 |
| 3,715,532 | 2/1972 | Morva | 174/28 |

FOREIGN PATENTS OR APPLICATIONS 1,214,287  4/1966  Germany ........................... 174/28

Primary Examiner—J. D. Miller
Assistant Examiner—Patrick R. Salce
Attorney, Agent, or Firm—M. J. Moran

[57] ABSTRACT

High-voltage electrical apparatus including electrically conducting rings or members intimately bonded to an associated dielectric barrier disposed between two spaced electrodes or conductors of the electrical apparatus having a dielectric medium disposed therebetween. In order to prevent the movement of a high-voltage propagating streamer along the dielectric barrier, the electrically conducting rings or shields are disposed along surfaces of the barrier and spaced from one another to isolate or compartmentalize certain sections of the barrier surface so that when a propagating streamer impinges upon the surface of one of the shields, it will be arrested and be prevented from further movement or propagation along the surface of the dielectric barrier.

13 Claims, 9 Drawing Figures

PATENTED OCT 8 1974  3,840,716

DISCHARGE CONTROL SHIELD FOR HIGH VOLTAGE ELECTRICAL APPARATUS INCLUDING A DIELECTRIC BARRIER

CROSS REFERENCE TO RELATED APPLICATION

Certain inventions disclosed in this application are related to those disclosed and claimed in copending applications Ser. No. 122,453 filed Mar. 9, 1971 by A. H. Cookson et al. and Ser. No. 306,492 filed concurrently by O. Farish and assigned to the same assignee as the present application.

BACKGROUND OF THE INVENTION

This invention relates to high-voltage apparatus or circuit interrupters including dielectric barriers.

High-voltage electrical apparatus or systems, such as coaxial transmission lines, transformers and circuit interrupters or breakers sometimes include dielectric barriers between two spaced electrodes, such as those of the type disclosed in application Ser. No. 122,453 previously mentioned. These barriers may completely enclose a central electrical conductor or electrode and be provided within the electrical apparatus or circuit breaker to prevent an electrical breakdown from a high-voltage electrical conductor which may be a central electrical conductor to a low-voltage electrical conductor through an associated dielectric medium. Because of the high potential applied between the conductors, electrical streamers or ionized paths may occur between one of the electrical conductors and the associated barrier, but not pass through the barrier to the other conductor. However, it has been found that occasionally a streamer which has propagated from one conductor to the barrier may move in a longitudinal sense along the surface of the barrier until it reaches a weak point in the barrier, such as a joint, a structurally weakened portion of the barrier or where the barrier terminates short of the termination of the opposite conductor from where it will break through or around the barrier and continue through the insulating or dielectric medium to the other conductor causing a complete flashover between the high voltage and low voltage conductors or electrodes.

SUMMARY OF THE INVENTION

In accordance with the invention, high-voltage streamers which impinge upon and move laterally along a dielectric barrier interposed between two electrodes in a fluid or vacuum insulating medium are prevented from further propagation along the barrier by raised or projecting portions of the barrier which may comprise intimately bonded electrically conducting rings or molded protrusions or portions which have been incorporated during the fabrication or forming process.

BRIEF DESCRIPTION OF THE DRAWING

For a better understanding of the invention reference may be had to the preferred embodiment exemplary of the invention shown in the accompanying drawings in which.

DESCRIPTION OF THE PREFERRED EMBODIMENTS

Figure 1:
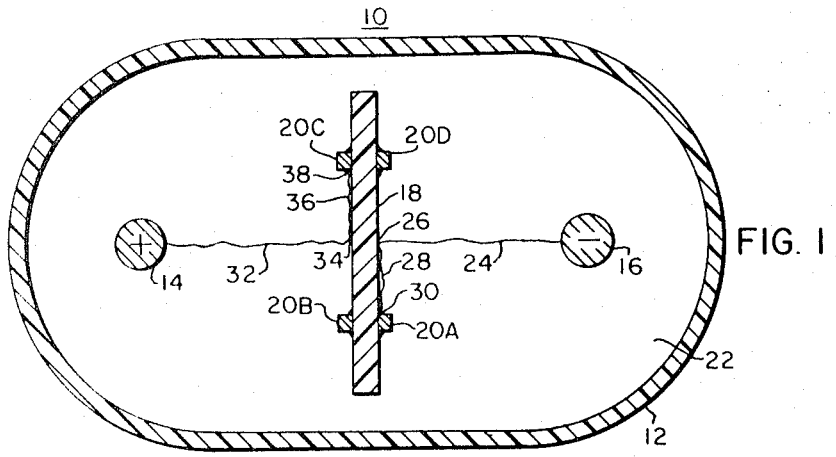
FIG. 1 shows a high-voltage electrical system embodying the invention and including a dielectric barrier upon which is mounted electrically conducting streamer control shields.

Referring now to the drawings and FIG. 1 in particular, a first embodiment of the invention is illustrated in which a closed container or housing 12 encloses a positive electrode 14 and a negative electrode 16, a dielectric barrier 18, and four electrically conducting discharge streamer control shields 20A, 20B, 20C and 20D. In addition, container or tank 12 encloses an insulating or dielectric medium 22, such as insulating oil, sulphur hexafluoride gas, air or vacuum. Consequently, any discharge which may tend to take place from positive electrode 14 to negative electrode 16 or the reverse will be initially deterred by the dielectric barrier 18. Discharge 32 in this case will be initially stopped by barrier 18 at point 34 where it may propagate laterally along barrier 18, as indicated by discharge path 36. However, the electrically conducting discharge streamer control shield or member 20C will prevent discharge path or streamer 36 from progressing any further than point or location 38 on barrier 18. Similarly, a discharge streamer 24 which may tend to propagate from electrode negative 16 to positive electrode 14 will be initially stopped or blocked by barrier 18 in the vicinity of region 26, whereupon it may attempt to propagate laterally as a streamer 28. Streamer 28 is prevented from further lateral propagation or movement by shielding structure 20A, as indicated in region 30. As can be seen, any discharge tending to extend between electrodes having a potential difference such as electrodes 14 and 16 will be substantially prevented by barrier 18 in association with discharge streamer control shields 20A, 20B, 20C or 20D.

Figure 2:
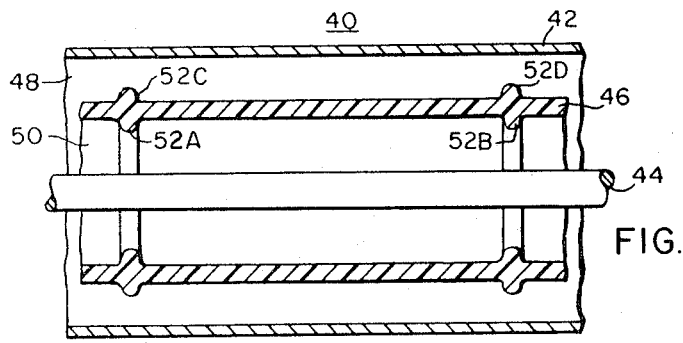
FIG. 2 shows a second embodiment of the invention including a coaxial electrically conducting system with an interposed tubular dielectric barrier, having associated therewith discharge streamer control shields.

Referring now to FIG. 2 a high-voltage coaxial, electrically conducting or power transmission system 40 is shown. The coaxial electrically conducting system 40 includes an outer electrode or tubular electrical conductor 42, an inner electrode, which may be a solid or tubular electrical conductor 44 and an intermediate dielectric barrier 46. During operation of the system 40, there may be a relatively high instantaneous electrical potential difference between conductors 42 and 44. In addition, the system 40 may include an insulating region 48 and an insulating region 50. Dielectric barrier 46 may have mounted thereon inner and outer discharge streamer control shields 52A and 52B and 52C and 52D respectively. Consequently any streamers which may begin at one electrode such as 42 and tend to propagate through the gaseous insulating medium 48 or 50 to the other electrode such as 44 may be stopped by the dielectric shield 46 and further propagation of the streamer or electrical discharge path along either the inner or outer surface of dielectric barrier 46 may be stopped or deterred by the dielectric raised portions or shields 52A, 52B, 52C or 52D. It is to be noted that the previously mentioned shields or protrusions 52A, 52B, 52C or 52D are an integral part of the barrier 46 and may be made by fabricating barrier 46 in the particular shape shown in FIG. 2.

Figure 3:
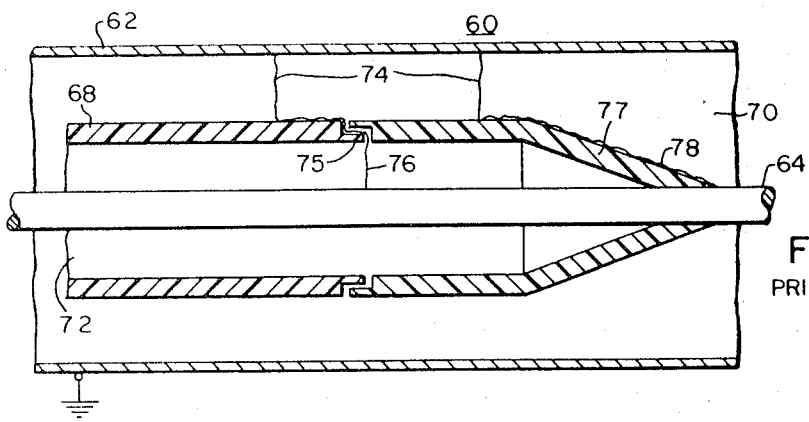
FIG. 3 shows known probable breakdown paths in a dielectric barrier which may form part of a known coaxial system or circuit interrupter or circuit breaker.

FIG. 3 shows an electrically conducting section of a high-voltage circuit breaker or circuit interrupter, such as disclosed in copending application Ser. No. 875,353 filed Nov. 10, 1969 by J. M. Telford and R. J. Bohinc now abandoned and assigned to the same assignee as the assignee of the present application. The electrical conducting system 60 which forms part of a circuit interrupter comprises a relatively low-voltage outer gas-containing vessel or electrical conductor 62, a relatively high-voltage solid electrical conductor 64, a dielectric barrier 68 and two dielectric regions 70 and 72. Dielectric streamers 74 are shown between the outer containing vessel or conductor 62 and the dielectric barrier 68. Further propagation of streamers 74 may occur through a joint 75 in the dielectric barrier 68, as shown by a streamer 76, or it may continue along the generally beveled or conical supporting section 77 as shown by streamer 78. Both streamers 76 and 78 are shown terminating on inner conductor 64 causing a complete electrical breakdown between conductors 62 and 64.

Figure 4:
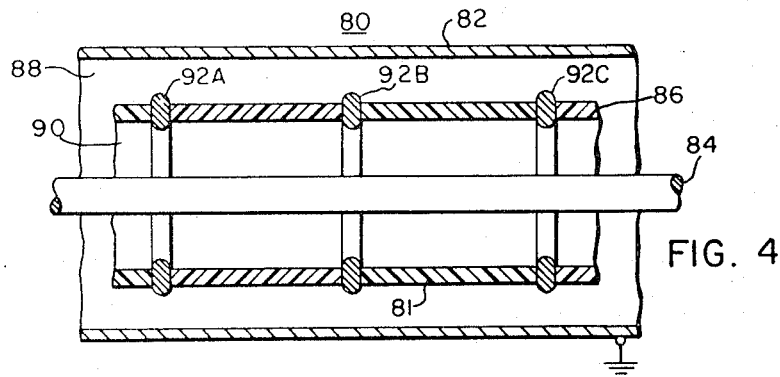
FIG. 4 shows a third embodiment of the invention including electrically conducting rings or annular members.

FIG. 4 shows another embodiment of the invention in a system 80 in which barrier 86 may comprise alternate sections of dielectric barrier material 81 and electrically conducting rings 92A, 92B and 92C which may be formed from copper or a copper alloy. Rings 92A, 92B and 92C are slightly larger in a radial direction than the width of barrier 86 so that the rings protrude or project radially in both directions from the barrier 86, thus providing both inner and outer streamer control shields for circuit breaker system 80.

Figure 5:
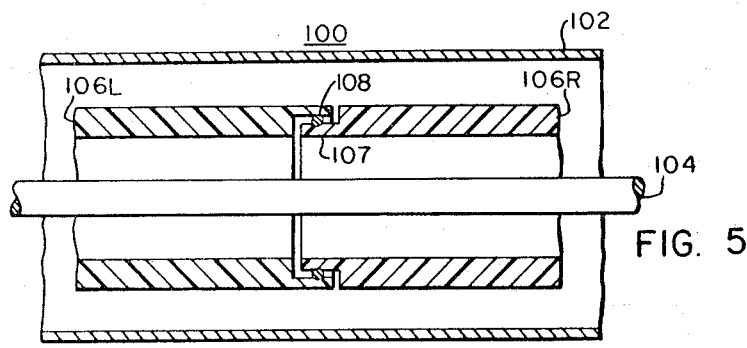
FIG. 5 shows a fourth embodiment of the invention comprising an electrically conducting ring at a structural joint between two sections of a dielectric barrier.

FIG. 5 shows another embodiment of the invention in a conducting system 100 in which two electrical conductors 102 and 104 and which may form part of a circuit breaker or electrical transmission device are isolated from each other by a sectioned dielectric barrier comprising sections 106L and 106R which are structurally joined as indicated by joint 107. An electrically conducting O-ring member or interposed generally circular structure 108 shields the joint 107 so that high voltage streamers (not shown) which may emanate from either conductor 102 or 104 are prevented from further propagating through joint 107 by the ring 108.

Figure 6:
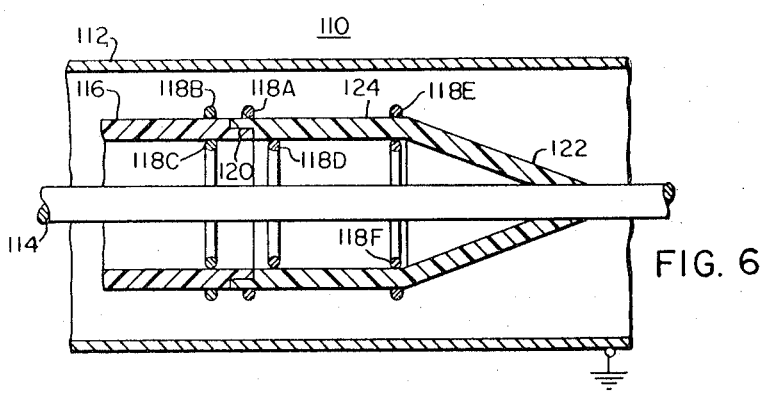
FIG. 6 shows a fifth embodiment including control shields associated with a dielectric barrier in a circuit breaker.

FIG. 6 shows another embodiment of a conducting system 110 which may form part of a circuit interrupter in which the electrodes or conductors 112 and 114 are electrically insulated from each other by barrier 116. It will be noted that the disclosed control rings 118A, 118B, 118C, 118D, 118E and 118F, which may be preferably formed from a zinc, tin, lead or copper based electrically conducting material, are used to isolate or compartmentalize critical sections of the dielectric barrier 116, such as structural joint 120 and conical support section 122. Rings 118A, 118B, 118C and 118D are located near the joint or junction 120 so that streamers propagating either from conductor 122 or 124 will be shielded from the joint 120 in a lateral direction along barrier 116. Similarly, control shields 118E and 118F will prevent streamers which impinge in the vicinity of section 124 of dielectric barrier 116 from further propagating to the bevel or conical section 122.

Figure 7:
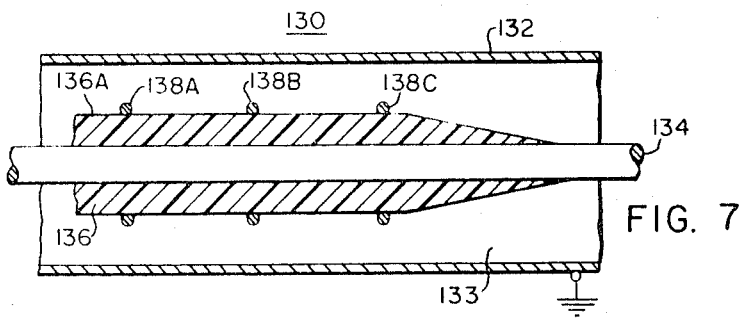
FIG. 7 shows a sixth embodiment including control shields disposed on a dielectric barrier which is intimately bonded to a high voltage electrical conductor.

Referring now to FIG. 7, another embodiment of the invention is shown in an electrically conducting system 130 in which a solid dielectric barrier 136 which may be intimately bonded to conductor 134 is used to assist in electrically isolating conductor 134 from outer electrical conductor or containment tank 132 in which the dielectric medium 133 is normally disposed. A plurality of rings or streamer shields 138A, 138B or 138C are strategically disposed or spaced along the solid barrier 136 to prevent streamers which may propagate from electrical conductor 132 toward electrical conductor 134 or vice versa from continuing lateral propagation or movement along the radial outer surface 136A of barrier 136.

Figure 8:
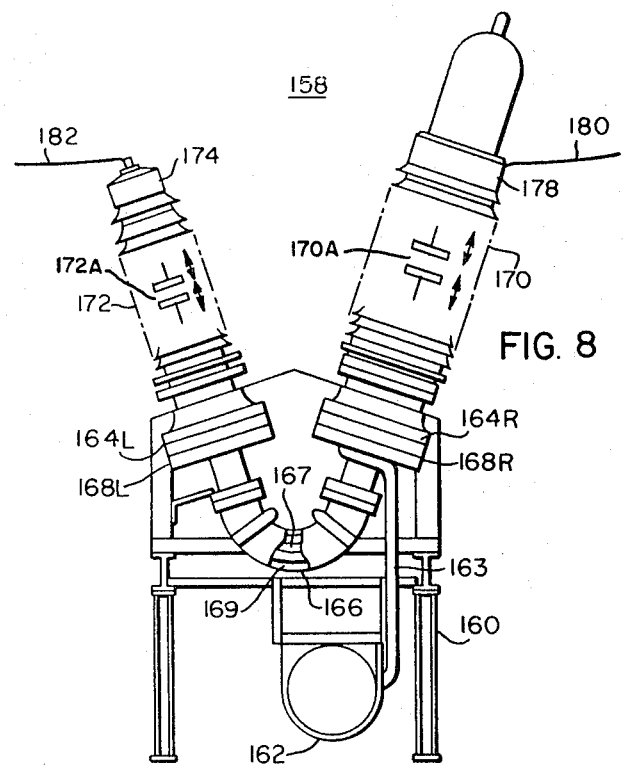
FIG. 8 shows a circuit breaker which incorporates a discharge control shield.

Referring now to FIG. 8 a circuit interrupter 158 similar to the one described in application Ser. No. 122,453 is shown, in which a barrier or similar means may be placed between electrodes 166 and 167 or in the vicinity of insulating space 169. This barrier may incorporate discharge control shields such as embodied in system 110 which has been described previously. The circuit breaker or interrupter 158 is not limited to this type of control shield however.

In addition, the embodiments shown in FIGS. 2, 4, 5, 6 and 7 may comprise part of an electrical switch including the switching section. As an example the high-voltage electrode 114 as shown in FIG. 6 may comprise a plurality of separate movable contacts.

Figure 9:
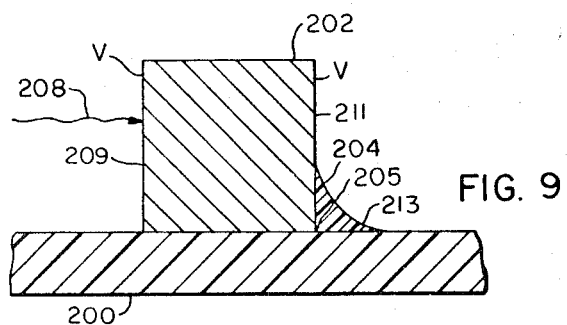
FIG. 9 shows the region where a discharge control shield joins a dielectric barrier.

Referring now to FIG. 9, the use of a cement comprising epoxy compound or moderately rigid elastomer as a filler or filet is shown. A portion of a barrier 200 has mounted thereon a metallic streamer control shield 202 which may be of the type shown in any of the previously shown or described embodiments. Assuming that a discharge streamer 208 impinges on surface 209, a voltage V is produced at surface 209. Voltage V will also exist at surface 211 as is known by the physical laws of electric field theory dealing with the distribution of electric charge in a conductor. However electrical stress on surface 211 is greater near the interface region or material corner 205 and this may initiate a new streamer over the barrier starting at the corner 205. A filler of high permittivity such as epoxy resin or cement 204, for example, may be provided to fill the corner, and this arrangement will reduce the stress in the corner and also along the surface 213 which is smooth, generally curved or generally arcuate as illustrated or which generally extends from a point on the side of the shield 202 which is spaced from the barrier 200 to a point on the surface of the barrier which is spaced from the shield 202. Consequently, the likelihood of continued propagation of streamer 208 to the right of conductor 202 is greatly reduced. It has been demonstrated by tests that the addition of a dielectric filler 204 near the edge or interface 205 increases the retarding ability of the conductor or control shield 202 to withstand discharge breakdown due to critical streamer propagation threshold voltage ($V_{bsp}$) by 60 to 70 percent over the retarding characteristic of a central shield 202 without an adjacent dielectric filler 204.

In the region 205, the electric field strength associated with charged conductor 202 and a barrier protected electrode (not shown) is greatest. The addition of the filet lessens the field strength because the cement filet has a high electrical permittivity. The electric field strength at the surface 213 is lessened or reduced because boundary conditions along surface 213 are mathematically constrained to prevent discontinuities in electric field strength between parallel oriented sections of different dielectric materials.

It is to be understood that the discharge streamer control shields as disclosed in the various embodiments may comprise electrically conducting portions or electrically insulating portions and the electrically insulating portions may be formed as integral parts of the barrier or may be bonded securely and intimately to the associated barrier by a suitable bonding material or compound, such as, but not limited to, epoxy cement or resin. It is also to be understood that the insulating medium employed in the various embodiments disclosed may be but is not limited to sulphur hexafluoride gas which may be pressurized at a relatively high pressure.

It is also to be understood that the discharge control shields may be incorporated into electric switches, circuit interrupters, circuit breakers, transmission cables or devices and any other high-voltage electrical system where high voltage streamer control is necessary. It is also to be understood that the tubular conducting sections or systems such as 110 do not have to be concentric. It is also to be understood that metallic discharge streamer control shields or rings may be formed from tin, lead or zinc based material.

The apparatus embodying the teachings of this invention has several advantages. For example, a pressurized gaseous electrically conducting system may be pressurized at a relatively higher value without significant changes in the flashover or breakdown potential of the system. The electrically conducting portions of the system may be moved or spaced closer together in a radial direction because streamers or breakdown arcs which might otherwise occur between such conductors are substantially prevented or eliminated by the presence of the discharge streamer control shields on the associated dielectric barriers which are interposed between the electrical conductors. In addition, the presence of the discharge streamer control shield may add structural strength to the previously mentioned dielectric barriers.

We claim as our invention:

1. A high-voltage electrical system comprising a pair of spaced electrodes, one of which is tubular and encloses the other, a dielectric voltage flashover barrier disposed between said electrodes conveniently supported in said system but spaced from at least one of said electrodes, dielectric filler material, at least one discharge streamer control shield disposed on said barrier forming a corner having a predetermined relatively sharp radius of curvature between one side of said discharge streamer control shield and the region of said barrier immediately adjacent the region where said discharge control shield is disposed upon said barrier, said discharge streamer control shield having disposed thereon in said corner said dielectric filler material in the form of a filet between said side of said barrier and said adjacent region of said shield to deter the initiation of an electrical streamer from said shield in the region of said filet.

2. The combination as claimed in claim 1 wherein said discharge streamer control shield is formed from electrically conducting material and is intimately bonded to said barrier.

3. The combination as claimed in claim 2 wherein said electrically conducting material comprises a zinc based material.

4. The combination as claimed in claim 2 wherein said electrically conducting material comprises a copper based material.

5. The combination as claimed in claim 1 wherein said discharge streamer control shield is formed from an electrically insulating material and is intimately bonded to said barrier.

6. The combination as claimed in claim 1 wherein said discharge streamer control shield comprises at least one integral raised portion of said barrier and is formed from substantially the same dielectric material as said barrier.

7. A circuit interrupter comprising separable main contacts, a first tubular electrode and a second electrode, said second electrode being connected in circuit relationship with said separable main contacts and spaced from and enclosed in said first electrode, a dielectric voltage flashover barrier disposed between said first electrode and said second electrode conveniently supported in said circuit interrupter but spaced from at least one of said first and said second electrodes, dielectric filler material, said barrier having at least one discharge streamer control shield disposed thereon, forming a corner having a predetermined relatively sharp radius of curvature between one side of said discharge streamer control shield and the region of said barrier immediately adjacent the region where said discharge control shield is disposed upon said barrier, said discharge streamer control shield having disposed thereon in said corner said dielectric filler material in the form of a filet between said side of said barrier and said adjacent region of said shield to deter the initiation of an electrical streamer from said shield near said corner.

8. The combination as claimed in claim 7 wherein said second electrode comprises a generally cylindrical elongated electrical conductor, said first electrode comprises a generally tubular electrical conductor, said second electrode being disposed within said generally tubular conductor and said barrier being disposed between said cylindrical conductor and said generally tubular conductor.

9. The combination as claimed in claim 8 wherein said discharge streamer-control shield is formed from electrically conducting material and is intimately bonded to said barrier and an insulating filler disposed on said streamer control shield proximate to said discharge barrier.

10. The combination as claimed in claim 9 wherein said electrically conducting material comprises a zinc based material.

11. The combination as claimed in claim 9 wherein said electrically conducting material includes copper based material.

12. The combination as claimed in claim 8 wherein said discharge streamer control shield is formed from an electrically insulating material and is intimately bonded to said barrier.

13. The combination as claimed in claim 8 wherein said discharge streamer control shield comprises at least integral raised portion of said barrier and is formed from substantially the same dielectric material as said barrier.

* * * * *